United States Patent [19]

Hatchett et al.

[11] Patent Number: 5,150,512
[45] Date of Patent: Sep. 29, 1992

[54] METHOD OF ASSEMBLING A DISK FILE

[75] Inventors: Michael R. Hatchett, Chandlers Ford; Anthony R. Hearn, South Wonston; Charles M. Lacey, Emsworth, all of England

[73] Assignee: International Business Machines Corporation, Armonk, N.Y.

[21] Appl. No.: 602,241
[22] PCT Filed: Mar. 15, 1989
[86] PCT No.: PCT/GB89/00267
§ 371 Date: Nov. 13, 1990
§ 102(e) Date: Nov. 13, 1990
[87] PCT Pub. No.: WO90/10934
PCT Pub. Date: Sep. 20, 1990

[51] Int. Cl.[5] ............................................. G11B 5/42
[52] U.S. Cl. .................................. 29/603; 360/98.08
[58] Field of Search ............... 360/98.01, 98.07, 98.08; 29/603, 434

[56] References Cited

U.S. PATENT DOCUMENTS 3,768,083 10/1973 Pejcha .
4,661,729 4/1987 Hames et al. .
4,782,410 11/1988 Okutsu .

FOREIGN PATENT DOCUMENTS

0222932A1 5/1987 European Pat. Off. .
0151259A 8/1985 Fed. Rep. of Germany .
56-169271 12/1981 Japan .

OTHER PUBLICATIONS

IBM Technical Disclosure Bulletin, vol. 31, No. 2, Jul. 1988–"Head Load/Unload Mechanism" by C. M. Lacey and R. R. Newman.
Patent Abstracts of Japan–Publication No. 57-98166 Entitled "Magnetic Disk Device".
Patent Abstracts of Japan–Publication No. 56-169272 Entitled "Magnetic Disk Device".

Primary Examiner—Carl E. Hall
Attorney, Agent, or Firm—Robert W. Lahtinen; Richard E. Billion

[57] ABSTRACT

A method of assembling a disk file comprises merging a pre-assembled actuator assembly and disk stack assembly prior to attaching them to a common base. The relative axial positions of the actuator assembly and disk stack assembly are measured and adjusted to align head arms with collapsed suspensions with the inter disk spaces. Once aligned the two assemblies can be moved together and the heads released.

7 Claims, 7 Drawing Sheets

METHOD OF ASSEMBLING A DISK FILE

TECHNICAL FIELD OF THE INVENTION

This invention relates to disk files and their assembly.

BACKGROUND OF THE INVENTION

A critical step in disk file assembly is the merge operation in which read/write heads are merged with the disk stack after first being mounted in a head positioning actuator. Conventionally, this operation takes place after the mounting of the disk stack assembly and the actuator assembly in a common base casting. The merge operation requires the pre-positioning of the heads beyond the disk stack periphery with the resilient head suspensions collapsed. This allows them to be moved subsequently into the inter disk spaces where the suspensions are released, thus allowing the heads to contact the disks. The risk of damage to the delicate heads and disk surfaces is very high during this operation.

Where the base casting does not restrict access, elaborate tooling may be employed to control the merge operations carefully. One such system is shown in GB 2196924A for a disk file having a relatively flat base casting and employing rotary actuators.

In some disk files, base castings with relatively high side walls surrounding the disks restrict access to the heads and disks at the critical point of merger during assembly. Such a disk file is shown in U.S. Pat. No. 4,661,729. Although not described in that patent, a special tool, as described in an article entitled "Head Load/Unload Mechanisms" by C. M. Lacey and R. R. Newman (IBM TDB Vol. 31 No.2 July 1988 p.231), is needed to effect head disk merge in such a disk file.

A recent trend in disk file design has been the provision of all round castings which are either split like a clam-shell or take the form of an open box, the open side of which is spanned by the disk stack in its axial direction. The latter type of structure is very strong. This, together with its inherent symmetry, allows greater track densities to be achieved than is otherwise the case with a conventional head positioning servo system. One example of such file is described in EP 0222932 Al. Head/disk merge is not discussed in this document but, in practice, could only be achieved by designing the base casting with cut away sides leaving the disk stack supported by only upper and lower flanges. Limited access to the heads and disks at the point of merging is then possible through the cut away side areas and the disk stack.

Other examples of box like base castings are in JP 56-169271A and GE 0151259A. The former document (abstract) does not show the actuator assembly or how it is merged with the disks but the relatively low number of disks in the stack may have enabled access to the heads through the inter-disk spaces. The latter document shows a swinging arm rotary actuator mounted on the same side of the box casting as the disk stack spindle which affords greater accessibility to the head/disk interface. This option is not available where a linear actuator is employed. Also, despite having some advantages, a swing arm rotary actuator is inherently asymmetrical as compared with a linear actuator mounted radially on a plane of symmetry of the disk stack assembly and positioning loops employing rotary actuators have a lower bandwidth.

DISCLOSURE OF THE INVENTION

The prior art has thus not provided a satisfactory method of merging heads and disks during the file assembly process where access to the head disk interface is restricted by the base casting.

Accordingly, the present invention provides a method of assembling a disk file of the kind in which information is recorded on and read from a stack of disks during rotation thereof by means of air bearing magnetic heads supported on resilient suspensions in a head arm stack and positionable over selected tracks of the disks by means of an actuator mechanism on which the head arm stack is mounted to form an actuator assembly, both disk stack and actuator mechanism being mounted on a common base, the method comprising the steps of:- pre-assembling such a disk stack assembly and such an actuator assembly; temporarily collapsing the head suspensions of the actuator assembly; temporarily supporting the pre-assembled actuator assembly and disk stack assembly for relative movement towards each other; measuring and adjusting the relative position of the actuator assembly and the disk stack assembly in a direction parallel to the disk axis of rotation so that the collapsed heads are aligned with the spaces between the disks; merging the actuator assembly with the disk stack by relative movement so that said heads enter the spaces between the disks; releasing the heads to contact the disk surfaces; registering the common base with the merged disk stack and actuator assembly in the position it will adopt in the finished product; and fastening the common base, actuator assembly and disk stack assembly together.

Although of most use with disk files having box frame bases and linear actuators, the invention may be employed with any shape of base or type of actuator where the base can be located on and registered with the disk stack and actuator assembly after their merger.

Although, preferably, measurements of actuator and disk stack position are adequate to enable the relative positions of the two assemblies to be adjusted, individual setting of each pair of heads on a common head arm could also be employed should tolerances be exceeded.

In the preferred method, the disk stack assembly is supported so that it is free to rotate after said merging step, the method comprising the further steps, after release of the heads but before registering and fastening the common base, of rotating the disk stack and testing the heads and disks by causing the heads to write and read back test signals from the disks.

This has the advantage, irrespective of the type of file and the problems of mechanical merger of cutting down rejection rates and the need for rework in that failing heads or disks can be identified and more easily replaced before they are assembled in the finished product.

Where the disk file is of the kind having a common base in the shape of a box frame open to at least one side, fitting over and partially enclosing the disk assembly, the method preferably includes the step of positioning the box frame on a fixed support arm, the pre-assembled actuator assembly being temporarily fixedly supported on the support arm in front of the box frame; effecting said merging step by moving the disk stack to the fixedly supported actuator assembly, and passing the box frame along the arm over the actuator assembly and partially over the disk stack assembly to effect said registration therewith.

Of course this can only work where the actuator assembly is smaller than and does not otherwise obstruct the box frame.

Where the disk file also has an internal motor and central stationary spindle within the disk stack, fastening is most conveniently achieved by bolting the frame to the spindle at its opposite ends.

If this type of file is to be allowed to rotate, e.g. for purposes of testing, prior to complete assembly, it is preferred to support the disk stack assembly on centres in contact with the spindle ends for rotation. Subsequently the disk stack must be supported by its rotatable hub portion and the centres withdrawn to permit bolting of the box frame to the spindle. It is also a further option to support the stack initially in a nest from which it is lifted by the insertion of the centres.

Although, movement of either or both actuator assembly and disk stack assembly is possible to effect the merger and such motion can be either linear or arcuate, it is preferred that the disk stack assembly is temporarily supported in a pivoted support arrangement which is pivotable to move the stack towards a fixed actuator assembly.

The method of assembly according to the invention enables a disk file design to be achieved comprising a common base in the shape of a box frame, open at both ends; a disk stack subassembly including an internal motor with a stationary central spindle, a rotatable hub and a stack of disk mounted on said hub for rotation therewith, the disk stack subassembly being supported by the ends of its stationary spindle across one open end of the box frame so that the frame surrounds and partially encloses more than half of the disk stack subassembly; and a linear actuator assembly including read/write heads mounted in the opposite open end of said box frame.

Thus, greater strength, rigidity and symmetry may be achieved than is possible with prior art designs in that the disk stack subassembly is surrounded by and mounted in a more extensive single piece metal base. With such a structure, head to track misregistration resulting from thermal and vibration effects is much reduced.

Additionally, a greater number of disks, each of maximum possible area, can be packed into a head/disk assembly of a given form factor to increase the overall capacity of the disk file.

BRIEF DESCRIPTION OF THE DRAWINGS

The invention will now be described, by way of example only, with reference to the accompanying drawings in which.

DETAILED DESCRIPTION OF THE INVENTION

Figure 1:
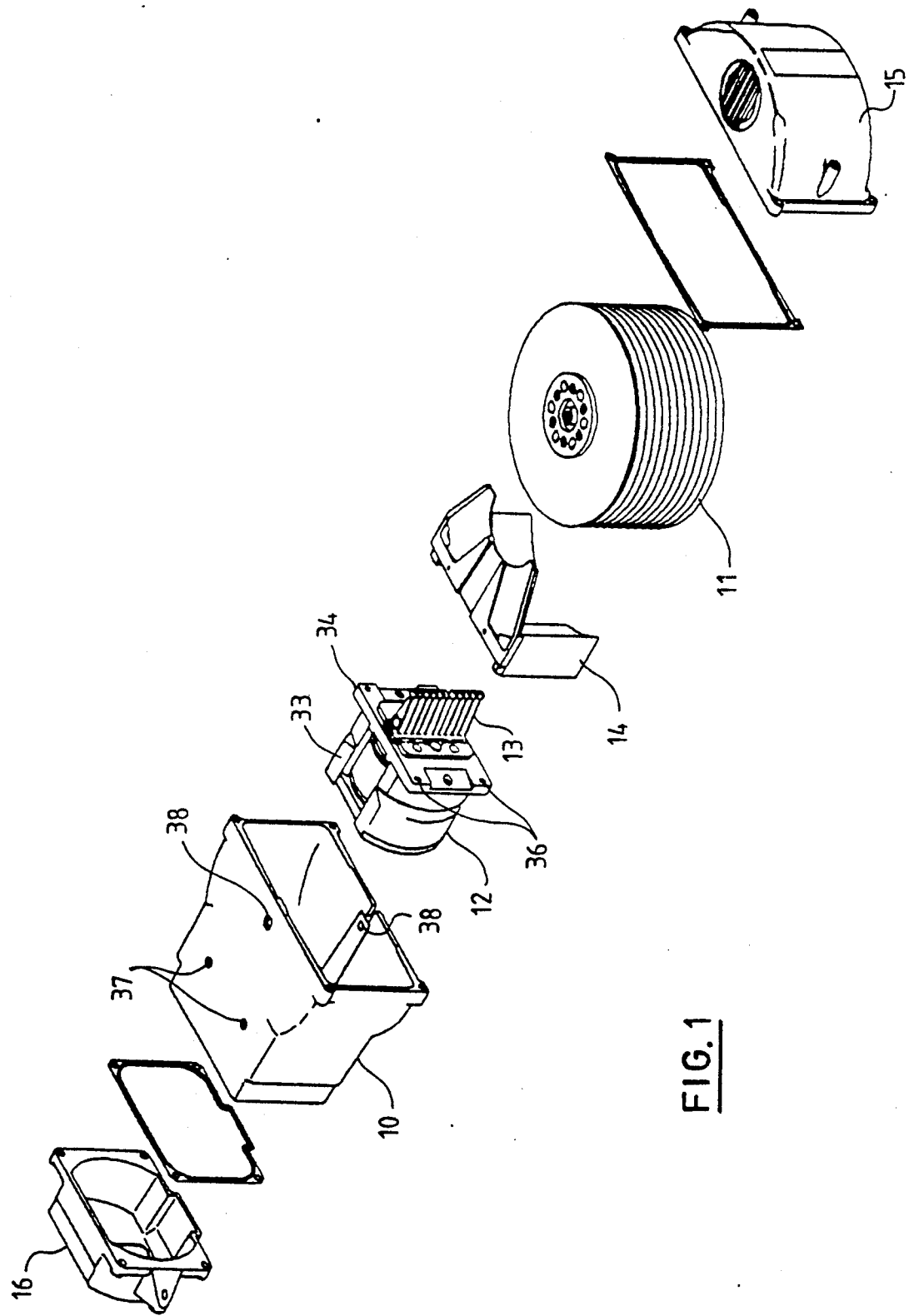
FIG. 1 is an exploded view of a disk file to be assembled by a method according to the present invention.
Figure 2:
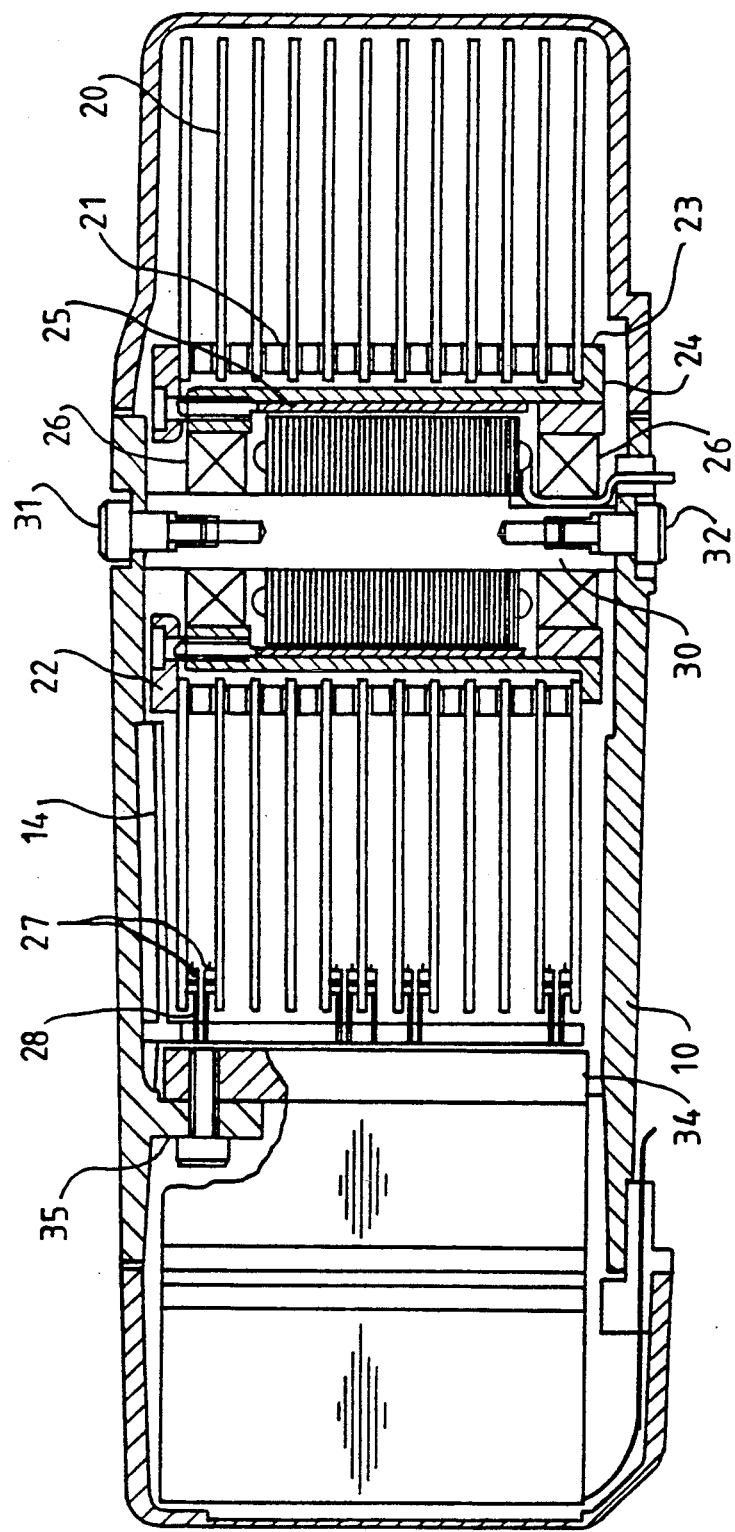
FIG. 2 is a cross section, broken away in part, through the disk file of FIG. 1, in its assembled state.
Figure 3:
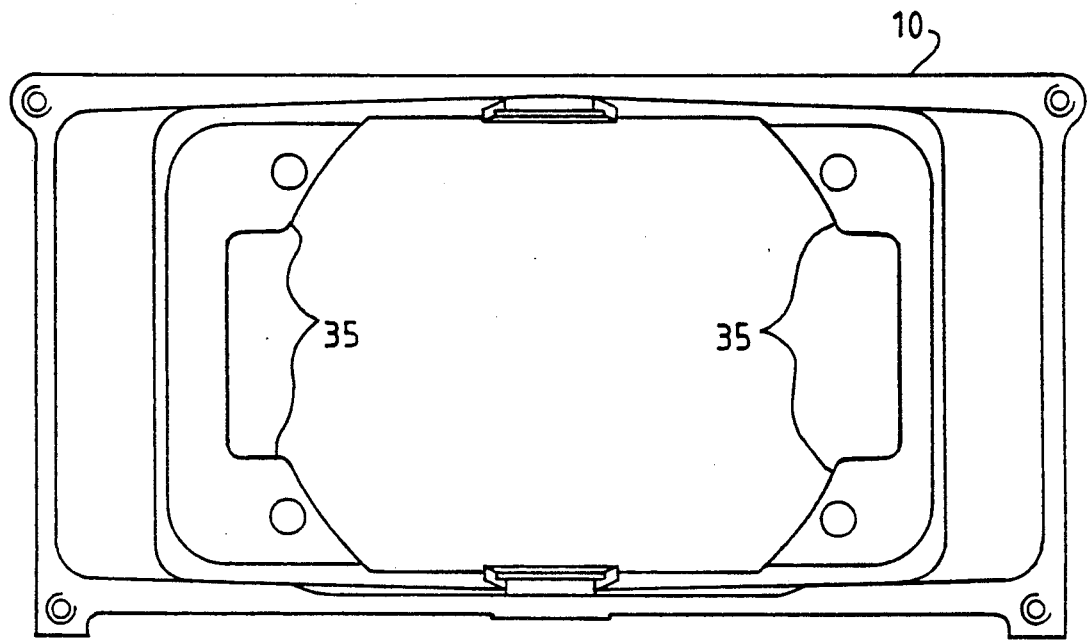
FIG. 3 is a front view of the open face of a base casting shown in FIG. 1.

As illustrated in FIGS. 1, 2 and 3, the disk file to be assembled consists of three major components, a base casting 10, a disk stack assembly 11, and an actuator assembly 12. The actuator assembly includes a head arm stack 13, carrying the magnetic read/write heads 17 for transferring information to and from the disks. Between the actuator assembly 12 and the disk stack assembly 11, is a filter assembly 14. A disk cover casting 15 and an actuator cover casting 16 and the necessary seals complete the disk file head/disk assembly (or HDA). As shown in more detail in FIG. 2 the disk stack assembly 11 consists of a stack of disks 20 separated by spacers 21 all clamped by disk clamp 22 onto the flange 23 of an in-hub motor 24. The hub of the motor is provided with rotor magnets 25 and rotates on bearings 26 about a central stator assembly mounted on a stationary spindle 30. The base casting 10 is bolted to the spindle 30 by two spindle bolts 31 and 32, these bolts consist of a dowel section for precise registration and a threaded section.

The actuator assembly 12 is a conventional linear voice coil motor consisting of a movable voice coil and carriage (not shown), on which the head arm stack 13 is mounted and a magnet assembly for producing flux across an internal annular air gap in which the voice coil is situated. The magnet assembly comprises four permanent magnet segments 3 and a soft magnetic flux return path a portion of which is visible in FIGS. 1 and 2 as front plate 34.

The head arm stack 13 includes a number of magnetic heads 27 mounted on resilient flexures 28 which bias them into contact with respective disks 20. Pairs of heads and flexures are mounted in back-to-back fashion on common rigid head arm portions mounted in the actuator carriage.

A front view of the base casting 10 is shown in FIG. 3. Within the base casting are four corner flanges 35 to which the actuator assembly is bolted through four holes 36 in the corresponding corners of front plate 34. The filter assembly 14, is also located within the base casting 10 to which it is bolted through two holes 37 in the top of the base casting.

The structure of the disk file of FIGS. 1 and 2, is extremely strong and symmetrical. This ensures that thermal and vibrational effects are minimised as a source of non repeatable error in the positioning of the heads over tracks on the disks. Thus, a higher track density than otherwise may be achieved within the capability of a conventional track following servo system. The strength of the design derives from the box frame shape of base casting 10 and the extent to which this surrounds and supports the disk stack assembly 11 and actuator assembly 12. Part of the strength also results from the stationary spindle 30 of the in-hub motor 24 which spans the major open side of the box casting and is rigidly bolted to it through holes 38 in the casting.

Conventional methods of disk file assembly in which the disk stack is bolted to the base casting prior to location of the actuator on the base casting cannot be employed with this design of file. This is because the base casting itself obstructs access to the heads 13 when they are being merged with the disks of disk stack 11. Prior to merger, it is necessary that the heads be collapsed, that is to say that the resilient suspensions on which the heads are mounted must be squeezed together so that pairs of heads are co-planar with the disk and can enter the inter disk spaces. When the heads have entered the inter disk spaces the suspensions must be released so that the heads move into resilient contact with the surfaces of the adjacent disks. The merge operation normally requires great manual dexterity or sophisticated tooling and in either case access is required to the heads as they approach the edge of the disk stack.

Figure 4:
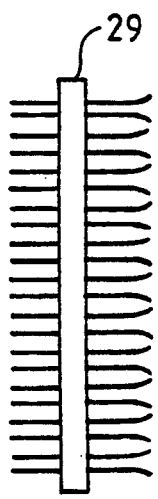
FIG. 4 is a side view of a head restraining tool employed in a method according to the invention.

In the present case, in the preassembled actuator assembly, the pairs of heads are temporarily restrained by means of the comb like tool 29 shown in FIG. 4. This is eased sideways over the suspensions 28 to collapse them against their spring bias so that the pairs of heads can fit into the inter disk spaces without the disk edges obstructing them. Even though the head restraint tool 29 is relatively simple, there is no way it could be manipulated and removed once the actuator assembly was within the base casting 10.

Figure 5:
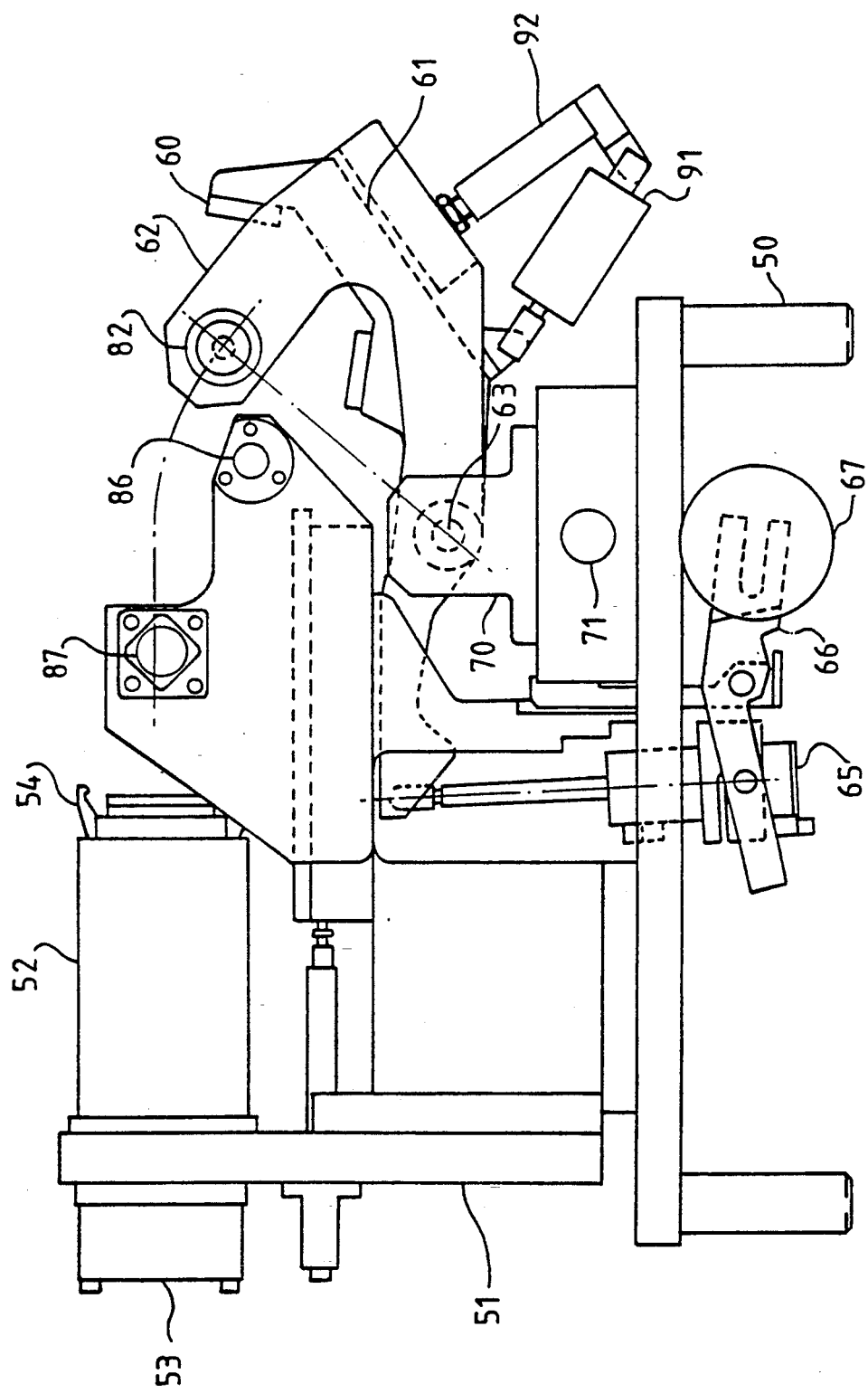
FIG. 5 is a side elevation of apparatus for assembling the disk file of FIGS. 1 and 2 in accordance with a method according to the invention.
Figure 6:
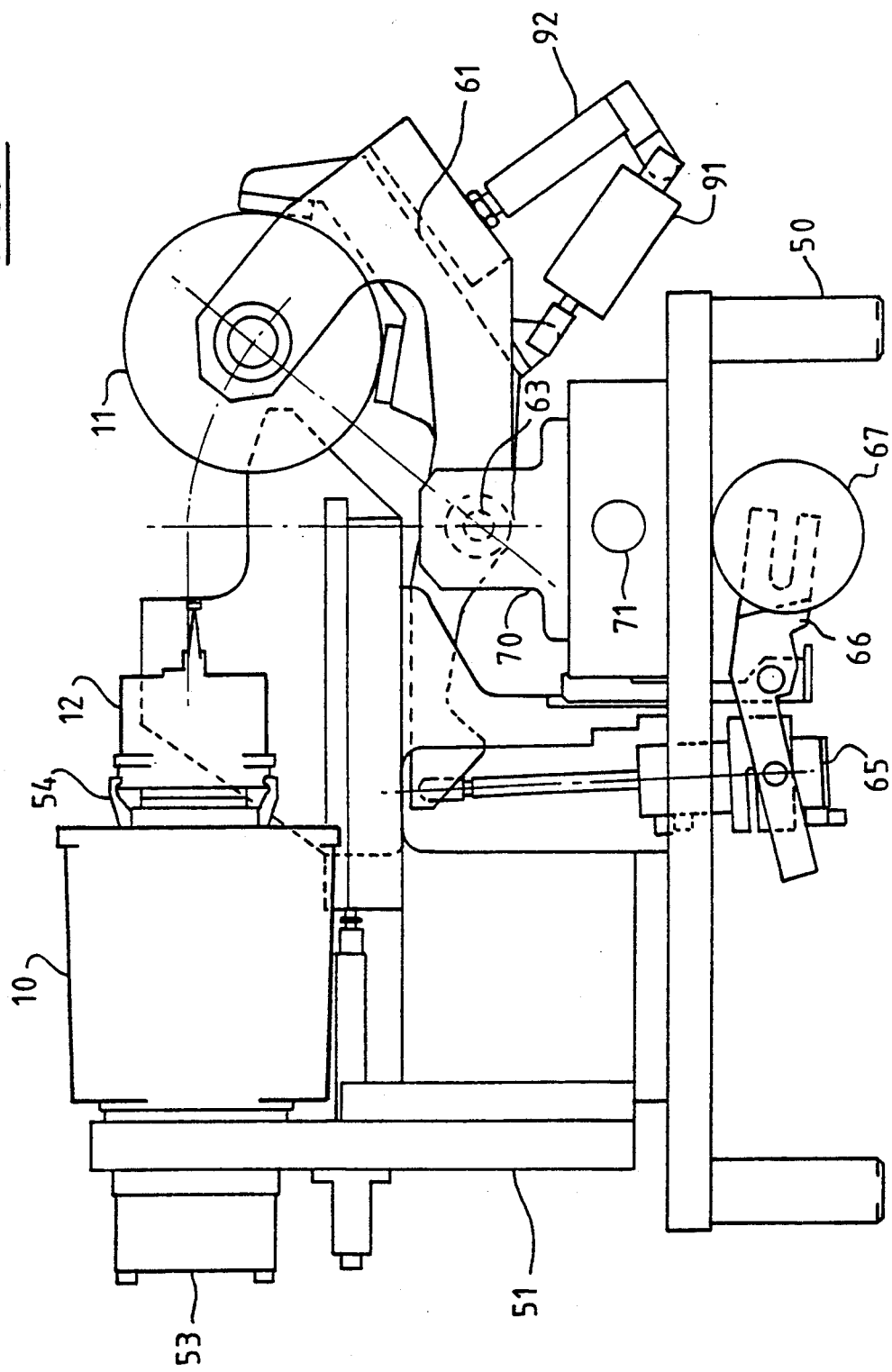
FIG. 6 shows the apparatus of FIG. 3 with portions removed for clarity and with components illustrated in FIG. 1, located ready for assembly.

The apparatus of FIG. 5 to 8, overcomes this difficulty by permitting the disk stack assembly 11 and actuator assembly 12 to be merged prior to their mounting in the base casting 10. FIG. 5, shows the manufacturing assembly apparatus without any disk file components in place. It consists of a support table 50 and upright pillar 51 at the top of which is a horizontal cantilevered fixed arm 52. The base casting 10, is first slid to the rear of arm 52 on nylon slides as illustrated in FIG. 6. The arm 52 incorporates an air cylinder 53 which operates two jaws 54. These jaws are used to hold an actuator assembly 12, complete with head arm stack 13, on the end of the arm.

The remainder of the apparatus of FIG. 5 is used to support and adjust the position of the disk stack assembly 11. Initially the disk stack 11 is placed in a V nest 60 at one end of an inner crank 61. The crank 61, together with an outer crank 62, is pivoted about a shaft 63. The opposite end of the inner crank is movable by an air cylinder 65 to move the disk pack 11 in an arc towards the actuator assembly. Fine control of this movement is effected by a further link 66 operated by cam wheel 67.

The entire double crank assembly is mounted on a sliding block 70 for movement parallel to the disk axis. Such movement is controlled by a knob 71, connected to a lead screw (not shown).

Figure 7:
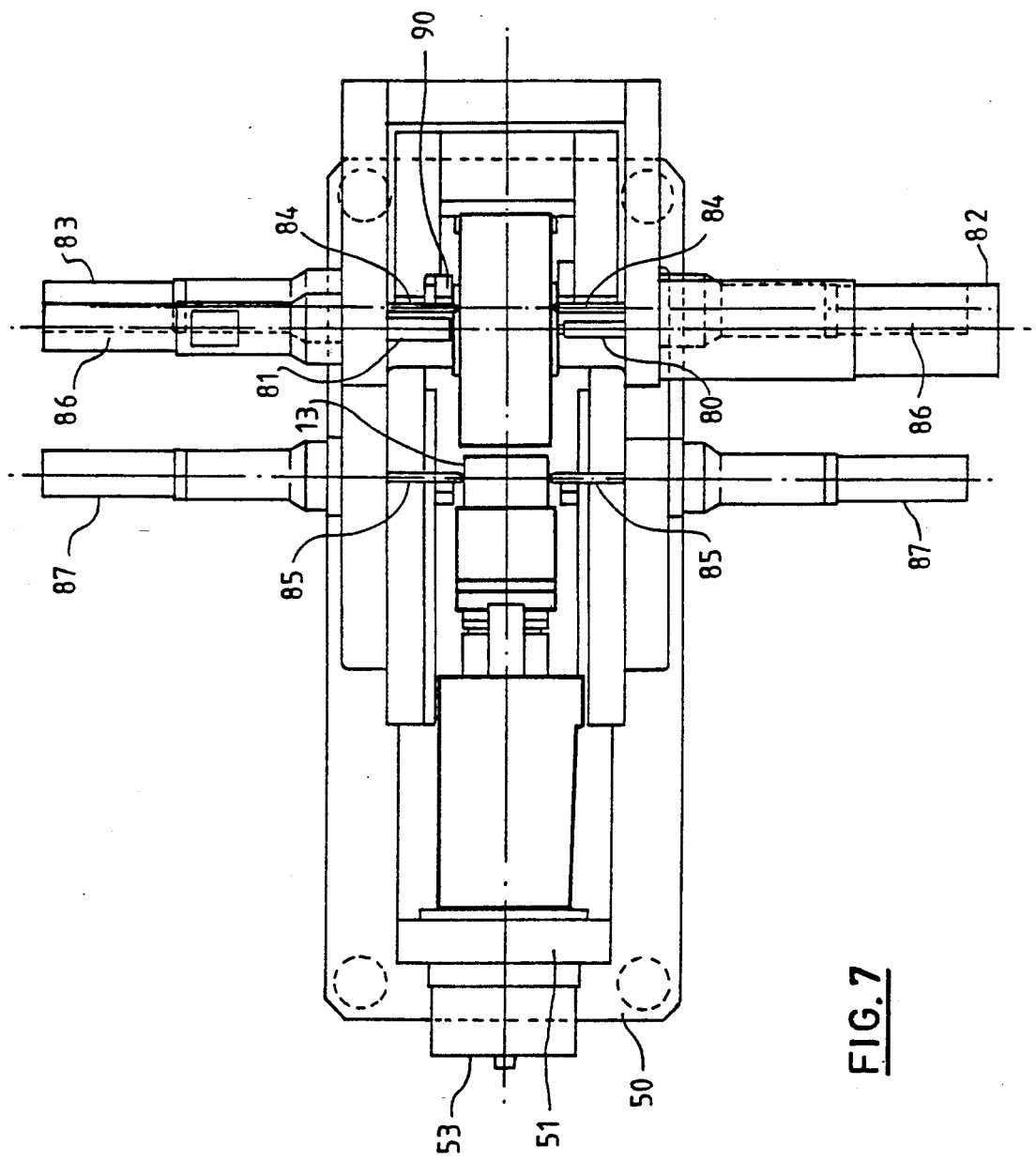
FIG. 7 is a plan view of the disk file components and apparatus of FIG. 6 prior to merger of the disk stack and actuator assemblies of the disk file.

As more clearly visible in FIG. 7, before any movement of the disk stack takes place it is transferred from the V nest 60 to a pair of centres 80 and 81 which are driven to contact the ends of spindle 30 by two air cylinders 82 and 83. Upon contact with the ends of spindle 30 the centres lift the disk stack 11 clear of the V nest 60 thereby permitting it to rotate freely. Air cylinder 65 is then operated to swing the disk stack 11 supported on centres 80 and 81 automatically to the immediate proximity of head arm stack 13, the heads being fully extended from actuator 12.

The relative positions of the disk stack and head arm stack in the axial direction are now measured by probes 84 and 85. The probes 84 and 85 are driven by cylinders 86 and 87 respectively. Probes 85 detect the rigid arm portions of the outermost head arms in the stack. A visual indication is provided to the operator to indicate whether the disk stack and heads are in or out of line. If they are out of line, the adjustment knob 71 is rotated to move the disk stack axially and align the components so that the heads which are collapsed can enter the inter disk spaces. The head suspensions are collapsed in advance by means of a the tool 29 which has been manually inserted by the operator. The collapsed heads can be centred on the inter disk spaces by skewing tool 29 slightly to alter the position of the collapsed head pairs.

When the disk stack and actuator are correctly aligned, the operator completes the merge operation by rotating cam wheel 67. This causes the disks to pass between their respective head arms 13. As soon as the heads are within the inter disk space, the head restraint tool 29 is carefully withdrawn to release the heads onto the surface of the disks. The heads are released at a predetermined position so that they contact a reserved landing track on the disk surface. This completes the merger of the disk stack and actuator assemblies.

In this partially assembled state, the disk stack may now be rotated by means of its own internal motor and each combination of head and disk may be tested by writing a test pattern and reading it back. In this way faulty heads or disk can be identified prior to final assembly and the consequent need for rework or rejection minimised.

After testing of the heads and disks, to ensure that none are faulty the base casting 10 can now be safely assembled to the premerged actuator and disk stack. Before this can be done the disk stack must be transferred from centres 80 and 81 to a hub clamp 90 located within the inner crank 61. The basic reason for this transfer is that the base casting extends past the axis of the disk stack and the clamp bolts 31 and 32 must be inserted through the casting holes 38 into the tapped bores in the ends of spindle 30. The hub clamp 90 is operated by an air cylinder (not shown) within the inner crank 61 and bears on the disk clamp 22. The outer crank 62 is now withdrawn by operation of another air cylinder 91 and a pivoted link 92 to the position shown in FIG. 8. At this point in the assembly sequence, the filter assembly 14 is slipped down a couple of grooves formed in the front face of actuator 12.

Once the crank 62 has been withdrawn, the ends of the disk stack are exposed to permit the base casting 10 to be slid over the actuator 12 and the disk stack until the holes 38 register with the bores in spindle 30. When the base casting is in position the spindle bolts 31 and 32 are inserted and tightened. The walls of the base casting are pinched slightly together as the bolts are tightened to clamp the spindle itself against rotation. The actuator assembly 12 may now be bolted to the cross flanges 35 in the base casting 10 by bolts inserted from the rear through the corner holes 36 in its front plate 34.

Figure 8:
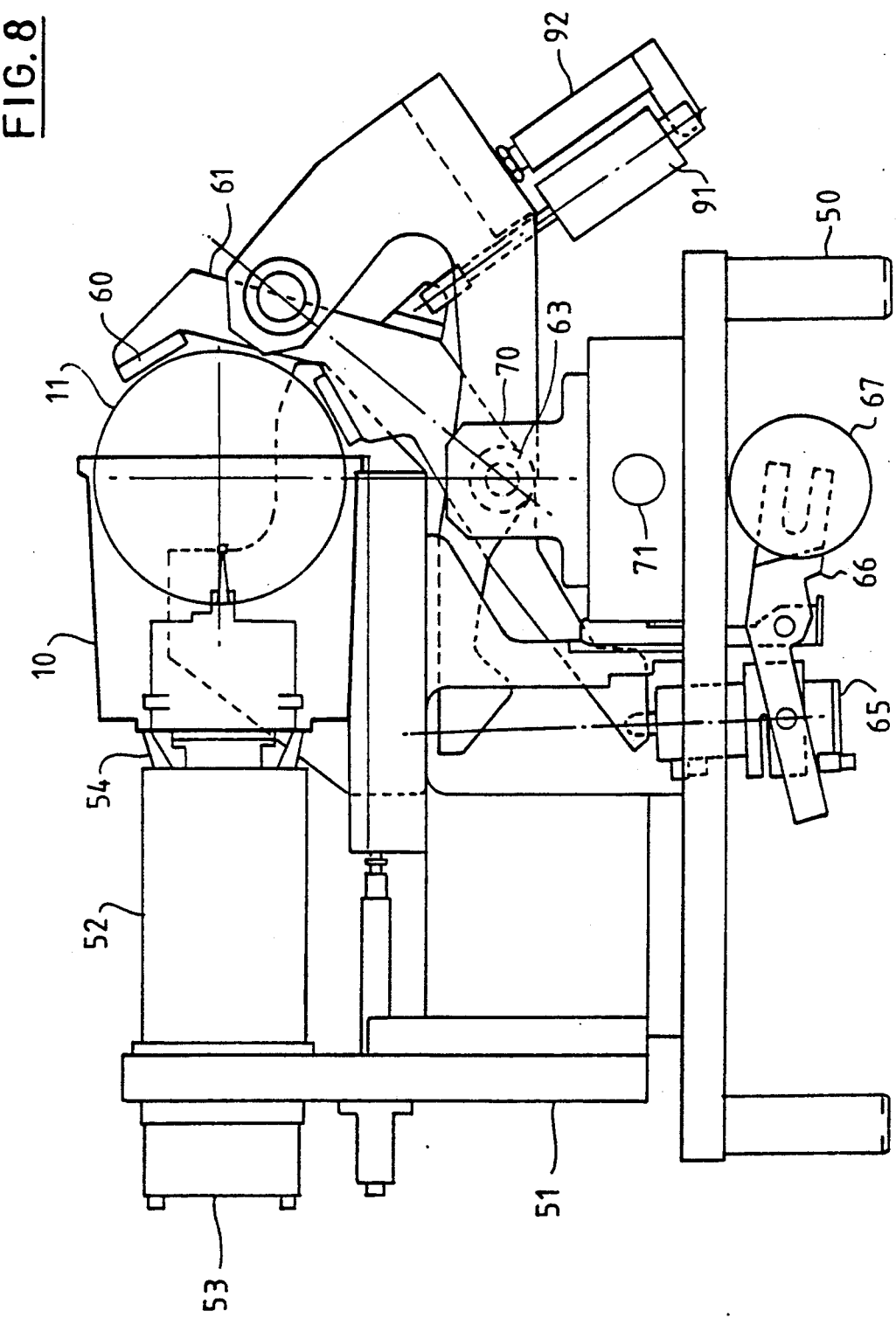
FIG. 8 is a further side elevation of the apparatus of FIGS. 4 to 7 with the disk file assembly operation completed.

The two assemblies in the base casting continue to be supported by the actuator clamping jaws 54, as shown in FIG. 8, while the hub clamp 90 is released and the inner crank 61 is withdrawn. The partially assembled disk file may then be removed manually from arm 52 by release of jaws 54. The cover castings 15 and 16 and their respective seals can now be attached to the opposite open ends of the base casting on the bench.

We claim:

1. A method of assembling a disk file in which information is recorded on and read from a stack of disks (11) during rotation thereof by means of air bearing magnetic heads (27) supported on resilient suspensions (28) in a head arm stack (13) and positionable over selected tracks of the disks by means of an actuator mechanism on which the head arm stack is mounted to form an actuator assembly (12), both disk stack and actuator assembly being mounted on a common base (10), the method comprising the steps of:

pre-assembling such a disk stack assembly and such an actuator assembly;

temporarily collapsing the head suspensions (28) of the actuator assembly;

temporarily supporting the pre-assembled actuator assembly and disk stack assembly for relative movement towards each other;

measuring and adjusting the relative position of the actuator assembly and the disk stack assembly in a direction parallel to the disk axis of rotation so that the collapsed heads are aligned with the spaces between the disks;

merging the actuator assembly with the disk stack by relative movement so that said heads enter the spaces between the disks;

releasing the heads to contact the disk surfaces;

registering the common base with the merged disk stack and actuator assembly in the position it will adopt in the finished product; and fastening the common base, actuator assembly and disk stack assembly together.

2. A method of assembling a disk file as claimed in claim 1 in which the disk stack subassembly is supported so that it is free to rotate after said merging step, the method comprising the further steps, after release of the heads but before registration and fastening of the common base, of rotating the disk stack and testing the heads and disks by causing the heads to write and read back test signals from the disks.

3. A method of assembling a disk file as claimed in claim 1 or claim 2 in which the disk file has a common base in the shape of a box frame open to at least one side fitting over and partially enclosing the disk assembly, the method including the further steps of positioning the box frame on a fixed support arm (52), the pre-assembled actuator assembly being temporarily fixedly supported on the support arm in front of the box frame;

effecting said merging step by moving the disk stack to the fixedly supported actuator assembly; and passing the box frame along the arm over the actuator assembly and partially over the disk stack assembly to effect said registration therewith.

4. A method of assembling a disk file as claimed in claim 3 in which the disk file has an internal motor (24) and central stationary spindle (30) within the disk stack assembly, the fastening step comparison bolting the box frame to the spindle at opposite ends of the spindle.

5. A method of assembling a disk file as claimed in claimed 4 in which the step of temporarily supporting the disk stack assembly includes supporting the disk stack subassembly on centres (80, 81) in contact with its spindle ends to permit rotation of the disk stack, and subsequently supporting the disk stack by a rotatable hub portion (22) thereof, with the centres withdrawn, to permit bolting of the box frame to the spindle.

6. A method of assembling a disk file as claimed in claim 5 including the step of initially supporting the disk stack subassembly in a nest (60), and inserting the centres into tapped ends of the stationary spindle to lift the disk stack subassembly clear of the nest so as to support it for rotation.

7. A method of assembling a disk file as claimed in claim 3 in which the disk stack assembly is temporarily supported in a pivoted support arrangement (61, 62, 63) which is pivotable to move the disk stack assembly towards the actuator assembly for merger, the actuator assembly being supported in a fixed position.

* * * * *